United States Patent
Schnittger et al.

(10) Patent No.: US 11,091,137 B2
(45) Date of Patent: *Aug. 17, 2021

(54) PNEUMATIC BRAKING DEVICE

(71) Applicant: KNORR-BREMSE Systeme fuer Nutzfahrzeuge GmbH, Munich (DE)

(72) Inventors: Karsten Schnittger, Munich (DE); Christian Kuhlen, Aschheim (DE); Fabian Griesser, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 313 days.

This patent is subject to a terminal disclaimer.

(21) Appl. No.: 15/972,967

(22) Filed: May 7, 2018

(65) Prior Publication Data

US 2018/0251111 A1 Sep. 6, 2018

Related U.S. Application Data (63) Continuation of application No. PCT/EP2016/076409, filed on Nov. 2, 2016.

(30) Foreign Application Priority Data

Nov. 6, 2015 (DE) ............ 10 2015 119 135.0

(51) Int. Cl.
*B60T 7/20* (2006.01)
*B60T 13/26* (2006.01)
(Continued)

(52) U.S. Cl.
CPC ........... *B60T 13/263* (2013.01); *B60T 11/326* (2013.01); *B60T 13/22* (2013.01); *B60T 13/261* (2013.01);
(Continued)

(58) Field of Classification Search
CPC .... B60T 13/683; B60T 13/385; B60T 11/326; B60T 13/263; B60T 13/662; B60T 13/261; B60T 15/041
See application file for complete search history.

(56) References Cited

U.S. PATENT DOCUMENTS

| | | | | |
|---|---|---|---|---|
| 5,042,883 A | * | 8/1991 | McCann | B60T 8/327 |
| | | | | 303/7 |
| 5,061,015 A | * | 10/1991 | Cramer | B60T 13/263 |
| | | | | 303/15 |

(Continued)

FOREIGN PATENT DOCUMENTS

| | | |
|---|---|---|
| CN | 101312864 A | 11/2008 |
| CN | 103068647 A | 4/2013 |

(Continued)

OTHER PUBLICATIONS

International Search Report (PCT/ISA/210) issued in PCT Application No. PCT/EP2016/076409 dated Feb. 6, 2017 with English-language translation (Five (5) pages).

(Continued)

*Primary Examiner* — Nicholas J Lane
(74) *Attorney, Agent, or Firm* — Crowell & Moring LLP (57) ABSTRACT

A pneumatic braking device for a utility vehicle includes at least one pneumatically controllable spring accumulator for a parking brake of the utility vehicle and an electronic parking brake device. The electronic parking brake device has at least one electronic control unit, at least one bistable valve unit, at least one first valve unit by which a parking brake of a trailer of the utility vehicle can be deactivated when activating the parking brake of the utility vehicle, at least one second valve device which can be connected in such a way that when there is a decrease in the system pressure for supplying the parking brake of the trailer, the (Continued)

parking brake of the trailer can be activated, and a traction vehicle protection valve.

10 Claims, 7 Drawing Sheets

(51) Int. Cl.
    *B60T 11/32*     (2006.01)
    *B60T 13/22*     (2006.01)
    *B60T 13/38*     (2006.01)
    *B60T 15/04*     (2006.01)
    *B60T 13/66*     (2006.01)
    *B60T 13/68*     (2006.01)
    *B60T 17/00*     (2006.01)

(52) U.S. Cl.
CPC .......... *B60T 13/385* (2013.01); *B60T 13/662* (2013.01); *B60T 13/683* (2013.01); *B60T 15/041* (2013.01); *B60T 17/004* (2013.01); *B60T 2270/403* (2013.01)

(56) References Cited

U.S. PATENT DOCUMENTS

| | | | |
|---|---|---|---|
| 2005/0029859 A1* | 2/2005 | Bensch | B60T 13/68 303/89 |
| 2005/0116533 A1 | 6/2005 | Herges et al. | |
| 2009/0309413 A1 | 12/2009 | Bensch et al. | |
| 2010/0025141 A1* | 2/2010 | Bensch | B60T 8/327 180/271 |
| 2010/0072810 A1* | 3/2010 | Bensch | B60T 17/228 303/17 |
| 2010/0078988 A1* | 4/2010 | Bensch | B60T 13/04 303/3 |
| 2010/0252378 A1* | 10/2010 | Hilberer | B60T 13/683 188/106 F |
| 2011/0062774 A1* | 3/2011 | Bensch | B60T 13/385 303/9.61 |
| 2011/0303500 A1* | 12/2011 | Hilberer | B60T 17/04 188/170 |
| 2013/0015024 A1 | 1/2013 | Vuckovic | |
| 2013/0221735 A1 | 8/2013 | Kiel et al. | |
| 2018/0251112 A1* | 9/2018 | Griesser | B60T 13/662 |

FOREIGN PATENT DOCUMENTS

| | | |
|---|---|---|
| CN | 104540715 A | 4/2015 |
| CN | 104968543 A | 10/2015 |
| DE | 101 32 493 A1 | 1/2003 |
| DE | 10 2004 010 743 A1 | 1/2006 |
| DE | 10 2005 058 799 A1 | 6/2007 |
| DE | 10 2008 014 458 A1 | 9/2009 |
| DE | 10 2008 007 877 B3 | 11/2009 |
| DE | 10 2010 011 978 A1 | 9/2011 |
| EP | 0 976 636 A2 | 2/2000 |
| EP | 0 976 636 B1 | 12/2004 |
| EP | 1 571 061 B1 | 12/2006 |
| EP | 1 504 975 B1 | 3/2007 |
| EP | 1 504 975 A1 | 2/2008 |
| EP | 2 240 352 B1 | 10/2012 |
| EP | 2 254 779 B1 | 11/2013 |
| WO | WO 00/78591 A1 | 12/2000 |
| WO | WO 2007/065498 A1 | 6/2007 |
| WO | WO 2008/025398 A1 | 3/2008 |
| WO | WO 2009/046779 A1 | 4/2009 |
| WO | WO 2009/098003 A2 | 8/2009 |

OTHER PUBLICATIONS

German-language Written Opinion (PCT/ISA/210) issued in PCT Application No. PCT/EP2016/076409 dated Feb. 6, 2017 (five (5) pages).
International Search Report (PCT/ISA/210) issued in PCT Application No. PCT/EP2016/076410 dated Feb. 7, 2017 with English-language translation (Five (5) pages).
German-language Written Opinion (PCT/ISA/237) issued in PCT Application No. PCT/EP2016/076410 dated Feb. 7, 2017 (Five (5) pages).
German-language Office Action issued in counterpart German Application No. 102015119135.0 dated Aug. 2, 2016 (seven (7) pages).
Chinese-language Office Action issued in Chinese Application No. 201680078002.X dated Apr. 14, 2020 with English translation (12 pages).

* cited by examiner

PNEUMATIC BRAKING DEVICE

CROSS REFERENCE TO RELATED APPLICATIONS

This application is a continuation of PCT International Application No. PCT/EP2016/076409, filed Nov. 2, 2016, which claims priority under 35 U.S.C. § 119 from German Patent Application No. 10 2015 119 135.0, filed Nov. 6, 2015, the entire disclosures of which are herein expressly incorporated by reference.

This application contains subject matter related to U.S. application Ser. No. 15/973,052, entitled "Pneumatic Braking Device for a Utility Vehicle" filed on May 7, 2018.

BACKGROUND AND SUMMARY OF THE INVENTION

The present invention relates to a pneumatic brake device for a utility vehicle, comprising at least one pneumatically actuable spring brake cylinder and comprising an electronic parking brake device.

Pneumatic brake devices for utility vehicles (also referred to as commercial vehicles, for example trucks) which can also pull trailers are already known from the prior art. Systems of this kind are also equipped with a parking brake function which can be provided by an electronic parking brake device.

By way of example, in the United States of America, the parking brake function is realized by placing spring store brake cylinders both in the utility vehicle or tractor vehicle and also in the trailer. To this end, the respective spring stores are actuated by a pneumatic parking valve which fills or deaerates the spring stores directly, without the use of a relay valve. Here, the parking valve has a first valve part for the truck and a second valve part for the trailer. Said valve parts can be configured with different colors, for example such that the first valve part for the tractor vehicle has a yellow operating button and the second valve part for the trailer has a red operating button. Due to legal requirements, it may be necessary for the brake device to have a tractor protection valve. The tractor protection valve prevents a drop in the output air pressure for the service brake of the tractor vehicle in the event of a drop in pressure in the service brake of the trailer vehicle.

It is assumed here that compressed air may escape both from the compressed air line which provides compressed air to the trailer vehicle for the service brake and also from the compressed air line which provides compressed air to the trailer vehicle for the parking brake.

This is the case, for example, when the trailer vehicle becomes detached from the tractor vehicle and, in the process, both compressed air lines, which connect the tractor vehicle and the trailer vehicle, are torn away.

In other countries, a tractor protection valve of this kind is not used, but rather bistable valve units are used, as is known, for example, from DE 10 2008 007 877 B3.

As is known, in particular, from WO 2008/025398 A1, bistable valves are rejected in connection with the use of tractor protection valves, and instead it is ensured in some other way that it is possible to safely park the vehicle even in the event of a breakdown in the electrical voltage supply.

Further pneumatic brake devices for utility vehicles with a tractor protection valve are known, for example, from DE 101 32 493 A1, WO 00/78591 A1, WO 2009/046779 A1 and U.S. Pat. No. 5,061,015.

The object of the present invention is to develop a pneumatic brake device for a utility vehicle of the kind outlined in the introductory part in an advantageous manner, in particular to the effect that said pneumatic brake device is of comparatively simple and safe construction and can have additional safety precautions in comparison to the brake devices known from the prior art, and is operationally stable in the driving state and also in the braked state.

According to the invention, this object is achieved by a pneumatic brake device in accordance with embodiments of the invention.

According to the invention, it is provided that a pneumatic brake device for a utility vehicle is provided with at least one pneumatically actuable spring store for a parking brake of the utility vehicle and with an electronic parking brake device, further having at least one electronic control unit, at least one bistable valve unit, at least one first valve unit by means of which a parking brake of a trailer of the utility vehicle can be deactivated when the parking brake of the utility vehicle is activated, at least one second valve device which can be connected up in such a way that, when there is a drop in the system pressure for supplying the parking brake of the trailer, the parking brake of the trailer can be activated, and having a tractor vehicle protection valve.

The invention is based on the basic idea of providing a functionality in a pneumatic brake device for a utility vehicle so that the current condition of the brake device, that is to say driving or parking, is maintained even without electricity owing to the use of bistable valve units. The intention is then for the spring stores of the utility vehicle (tractor vehicle) and also of the trailer to be able to be aerated or deaerated by means of this bistable valve unit. Within the meaning of the invention, the term "bistable valve unit" is intended to be understood to mean, in particular, a pneumatically and/or electrically/electronically actuable valve unit, but not a control switch which pneumatically or electrically actuates a brake device or a parking brake device.

A first valve device is additionally provided, which first valve device can aerate the spring stores of the trailer when the spring stores of the tractor vehicle are deaerated. The second valve device can deaerate the spring stores of the trailer when the spring stores of the truck are aerated. This also includes, in particular, an emergency brake functionality which activates the parking brake of the trailer (emergency braking) when there is a drop in the system pressure for the trailer below a specific threshold value. Furthermore, a tractor protection valve is provided, by means of which a drop in the output air pressure for the service brake of the tractor vehicle in the event of a drop in pressure in the output air pressure for the service brake of the trailer vehicle is prevented. In other words, the tractor protection valve is arranged in such a way that the compressed-air connection between the tractor vehicle and the trailer vehicle can be interrupted in case of an emergency, Furthermore, it can be provided that both the parking brake of the tractor vehicle and also the parking brake of the trailer can be actuated by means of the bistable valve unit. A simple design of the parking brake device is possible in this way. Functional integration in the bistable valve unit is achieved owing to the fact that both the brake device of the tractor vehicle and also the brake device of the trailer can be actuated by means of the bistable valve unit.

The tractor vehicle protection valve can be a constituent part of the electronic parking brake device.

As an alternative, it can be provided that the tractor vehicle protection valve is a constituent part of an air treatment system of the pneumatic brake device.

The second valve device can have at least one pressure sensor by means of which a drop in the system pressure for the parking brake of the trailer below a prespecified threshold value can be ascertained and a signal can be generated, it being possible for the parking brake of the trailer to be activated by means of the electronic control unit on the basis of said signal. As a result, it is possible to establish in a simple and reliable manner whether there has been a drop in the system pressure in the trailer and the pressure there has fallen below a specific threshold value. The parking brake of the trailer can then be activated. This function is also called emergency braking.

Furthermore, it can be provided that the second valve device has at least one pneumatic valve by means of which the parking brake of the trailer can be activated. As a result, it is possible to activate the parking brake of the trailer separately, independently of the brake device of the tractor vehicle.

The bistable valve unit can comprise a bistable valve with feedback. The feedback can have the effect, for example, that an emergency braking function for the trailer can be integrated.

In this context, it can be provided that the bistable valve with feedback is a relay valve. It can be provided here, in particular, that a bistable valve function is achieved by the use of a relay valve as a bistable valve.

Furthermore, it can be provided that the bistable valve unit further has a throttle.

The volumetric flow rate of the feedback from the output of the relay valve to its control side can be limited by means of the throttle. As a result, it is possible to be able to better set the switching points of the relay valve.

The first valve unit can have the relay valve of the trailer and at least two further solenoid valves. In this context, it is also contemplated that the first valve unit is formed by the relay valve of the trailer and three solenoid valves. Here, the term "valve unit" is intended to be understood, in particular, to the effect that a plurality of components of a pneumatic brake device interact with one another in a functional manner. Owing to the interaction of the relay valve of the trailer and the solenoid valves, it is possible to actuate the brake device of the trailer, that is to say the spring stores of the trailer, and to do so separately from the brake device of the tractor vehicle. This means that it is also possible to be able to aerate the spring stores of the trailer even when the spring stores of the tractor vehicle are deaerated.

Furthermore, it can be provided that the second valve unit has the relay valve of the trailer, at least two further solenoid valves and also at least one pressure sensor. In this case too, the term "second valve unit" is intended to be understood to the effect that a plurality of components interact with one another for a specific functionality. Owing to the interaction of the relay valve of the trailer, at least a further two solenoid valves and also a pressure sensor, it is possible firstly to detect a drop in the system pressure for the trailer and a specific threshold value and, depending on this, in particular in interaction with the control electronics system of the pneumatic brake device, to switch the relay valve and the further two solenoid valves in such a way that the parking brake of the trailer can be activated, this being the same as an emergency brake. In particular, the supply line downstream of the relay valve of the trailer to the spring stores of the trailer can be monitored by means of the pressure sensor.

The second valve unit can further have the relay valve of the trailer and at least one deaeration valve. Owing to the deaeration, it is possible to be able to deaerate the spring stores of the trailer by means of the deaeration valve.

As an alternative, it is also contemplated that the bistable valve unit comprises a bistable valve without feedback.

In particular, it is contemplated in this context that the bistable valve of the bistable valve unit without feedback is a bistable 3/2-way valve which actuates a relay valve.

In particular, it can be provided that the bistable valve unit further comprises the valve of the utility vehicle. In this connection, it is also conceivable that the relay valve of the utility vehicle and also a further control valve jointly form the bistable valve unit in a functional respect.

Furthermore, it can be provided that the first valve unit has the relay valve of the trailer and at least one solenoid valve. However, it is also conceivable that, for example, more than one solenoid valve can also be provided.

It is also contemplated that the second valve unit has the relay valve of the trailer, at least one solenoid valve and also at least one pressure sensor.

A drop in pressure in the trailer can be detected by means of the pressure sensor and then a switching operation can be created by means of the solenoid valves and also of the relay valve, and the spring stores of the trailer can be deaerated by means of said switching operation.

In principle, it is contemplated that a drop in pressure is recorded by means of a pressure sensor, whereupon the spring stores of the trailer are deaerated by means of an electrical signal and by means of at least one solenoid valve.

As an alternative and/or in addition, a solution can also be provided in which the spring stores of the trailer are deaerated by means of a pneumatic valve when a drop in the system pressure for the trailer below a specific threshold value is detected by means of the second valve device, so that the parking brake of the trailer is activated (emergency braking).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
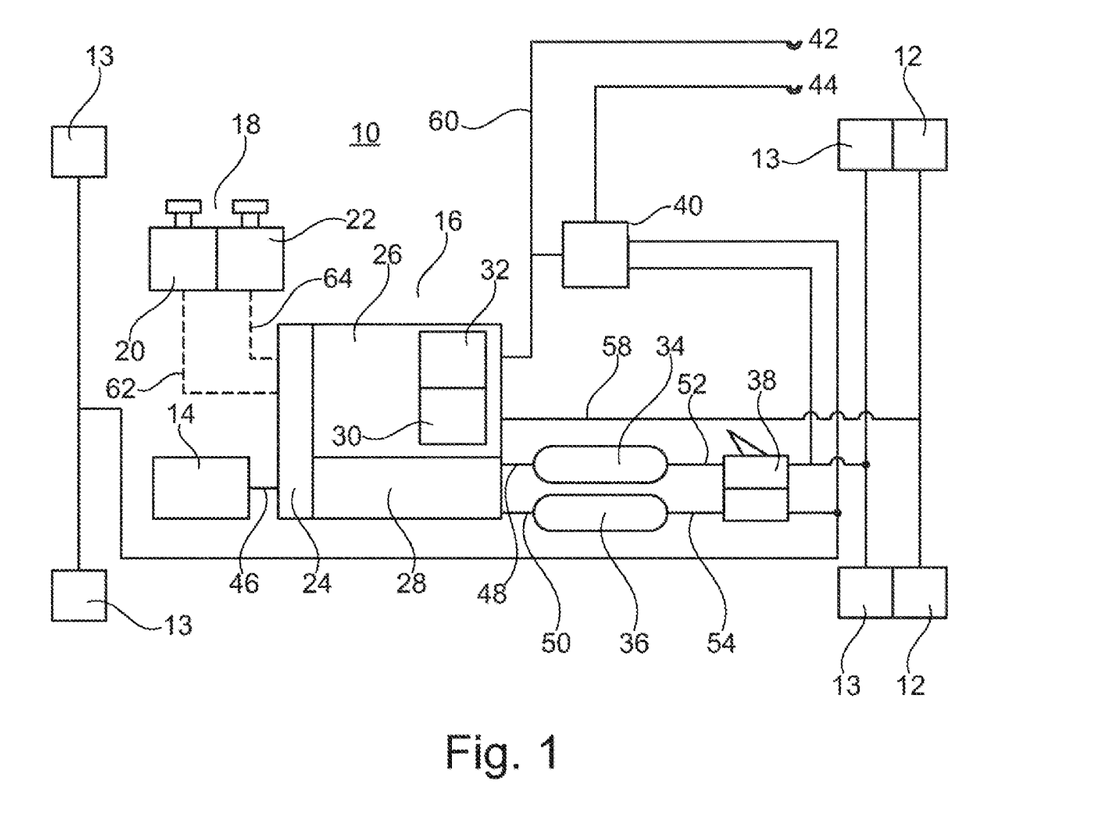
FIG. 1 is a schematic drawing of an exemplary embodiment according to the invention of a pneumatic brake device for a utility vehicle.

FIG. 1 shows a pneumatic brake device 10 for a utility vehicle, for example a truck (not illustrated in any detail).

The pneumatic brake device 10 has a plurality of pneumatically actuable spring stores 12 for the parking brake of the utility vehicle, also called tractor vehicle, and also pneumatically actuable brake cylinders 13 of the service brake for the front axle and also for the rear axle or the rear axles. In the exemplary embodiment shown, the spring store 12 and the brake cylinder 13 are designed as a spring store brake cylinder on the rear axle, with the spring store 12 for the parking brake function and with the brake cylinder 13 for the service brake.

Furthermore, a compressor 14 which is connected to an electronic parking brake device 16 is provided.

Furthermore, a parking valve switching element 18 which can have a first switch 20 and a second switch 22 is provided.

The electronic parking brake device 16 has an electronic control unit 24, a bistable valve unit 26, an air treatment arrangement 28 and also a first valve device 30 and a second valve device 32. A first compressed-air container 34 and a second compressed-air container 36 are provided downstream of the electronic parking brake device 16.

The foot brake valve 38 of the brake device 10 is further shown. Furthermore, a tractor vehicle protection valve 40 is provided.

The pneumatic brake device 10 further has a connection 42 for the spring store of a trailer and also a further separate connection 44 for the service brake of the trailer.

The compressor 14 is connected to the parking brake device 16 via a line 46. Lines 48 and 50, which lead to the container 34 and, respectively, to the container 36 adjoin the air treatment arrangement 28 downstream of the parking brake device 16.

The foot brake valve 38 is connected to the first container 34 via the line 52 and to the second container 36 via the line 54. The supply lines and line branches adjoin the brake cylinders 13 and, respectively, spring stores 12 downstream of the foot brake valve 38. The tractor vehicle protection valve 40 is likewise connected to said line, wherein the compressed air, which flows from said line branch to the tractor vehicle protection valve 40 and then flows further to the connection 44 for the service brake of the trailer or to the connection 42 for the spring store of the trailer, initially has to be routed through the tractor vehicle protection valve 40. The foot brake valve 38 is connected to the tractor vehicle protection valve 40 via a line 56.

The bistable valve unit 26 is connected to the spring stores 12 of the tractor vehicle via the line 58 and to the parking brake of the trailer via the line 60.

The first valve unit 30 is connected to the parking brake of the trailer via a line 60.

The second valve unit 32 is connected to the connection 42 for the spring stores of the trailer via a line 60.

The control electronics system 24 is connected to the parking valve switching element 18, wherein a first signal line 62 from the first switch is connected to the control electronics system 24 and a second line 64 is connected to the electronics system 24 which establishes a connection to the second switch of the parking valve switching element 18.

The pneumatic brake device 10 therefore has a plurality of pneumatically actuable spring stores 12 for the parking brake of the utility vehicle, and also an electronic parking brake device 16 which itself in turn has a control electronics system 24.

Furthermore, constituent parts of the electronic parking brake device 16 include a bistable valve unit 26 and also a first valve unit 30, by means of which the spring stores of the parking brake of the trailer of the tractor vehicle can be aerated, and also a second valve device 32 which can be connected up in such a way that the brake device of the trailer can be activated when there is a drop in the system pressure for the trailer of the tractor vehicle.

Both the parking brake of the tractor vehicle and also the parking brake of the trailer can be actuated by means of the bistable valve unit 26.

In this case, the bistable valve unit 26 can also comprise, in addition to the bistable valve, further valves which are not of bistable design. Said valve can be, for example, a relay valve for the parking brake of the trailer.

Here, the tractor vehicle protection valve 40 is a constituent part in the brake device, but, as an alternative, can also be designed as a constituent part of the electronic parking brake device 16 or as a constituent part of the air treatment system 28 of the pneumatic brake device 10.

The functioning of the pneumatic brake device 10 is as follows here:

The electronic parking brake device 16 comprises a control electronics system 24 and processes the control signals which are transmitted by the electronic parking valve 18.

Furthermore, information exchange takes place with the control electronics system 24 of the truck (not shown in detail).

The bistable valve 26 maintains its current position even without electricity. Said valve can aerate or deaerate the parking brake of the tractor vehicle and the parking brake of the trailer (via the line 58 and the line 60 and the connection 42) directly or jointly by means of one or more relay valves.

The first valve device 30 can aerate the spring stores of the trailer when the spring stores of the truck are deaerated. This is necessary, for example, for the trailer test function.

The second valve device 32 can deaerate the spring stores of the trailer, specifically via the line 60 and the connection 42, when the spring stores of the truck are aerated. This includes, in particular, an emergency brake functionality which activates the parking brake of the trailer (so-called emergency braking function) when there is a drop in the system pressure for the trailer below a specific threshold value.

Actuation of the brake device 10 by means of the electronic parking valve 18 comprising the switches 20 and 22 can be performed for the following operating states as follows:

In the driving state, the switch 20 for operating the parking brake device of the tractor vehicle and the switch 22 for operating the parking brake device of the trailer for example are pressed (as an alternative other operating positions are also conceivable).

As a result, the bistable valve unit 26 is connected through, while the first valve unit 30 and the second valve unit 32 are not connected through.

As a result, both the spring stores 12 for the parking brake of the tractor vehicle and also the spring stores for the parking brake of the trailer are released.

In the parked state, the two switches 20 and 22 are pulled, so that the bistable valve unit 26, the first valve unit 30 and the second valve unit 32 are not connected through.

Therefore, the spring stores 12 for the parking brake of the tractor vehicle are switched in such a way that the parking brake of the tractor vehicle is activated. This is also true of the spring stores for the parking brake of the trailer which is likewise switched in such a way that the parking brake of the trailer are activated.

An operating state in which the parking brake of the tractor vehicle is activated, but that of the trailer is not, can be used for the purpose of filling the trailer. This can also be used in order to carry out the so-called trailer test. The switch 20 is pulled and the switch 22 is pressed (activated). As a result, the bistable valve unit 26 is not connected through, but the first valve unit 30 is connected through. The second valve unit 32 is likewise not connected through.

The result of this is that the spring stores 12 for the parking brake of the tractor vehicle are switched in such a way that the tractor vehicle is braked and the spring stores for the parking brake of the trailer are switched in such a way that said spring stores are released.

In the "Park trailer" operating state (braking only by means of the trailer), the switch 20 is pressed and the switch 22 is pulled.

Consequently, the bistable valve unit 26 is activated, the first valve unit 30 is not activated, and the second valve unit 32 is activated.

The result of this is that the spring stores 12 for the parking brake of the tractor vehicle are switched in such a way that the tractor vehicle is unbraked and the spring stores for the parking brake of the trailer are activated, so that the trailer is braked.

In the "Emergency braking" operating state which is automatically activated, specifically when a drop in the system pressure for the parking brake of the trailer is detected, the tractor/trailer combination, comprising tractor vehicle and trailer, is usually in the driving state, that is to say the switch 20 and the switch 22 are both pressed. In contrast to the above-described driving state in which the bistable valve unit 26 is connected through and the first and the second valve unit 30, 32 are not activated per se, the second valve unit 32 is now switched in such a way, specifically automatically, that it likewise connects through.

The result is that the spring stores 12 for the parking brake of the tractor vehicle are further switched in such a way that the tractor vehicle is unbraked, but the spring stores for the parking brake of the trailer are switched in such a way that they are switched from the unbraked state to the braked state.

FIGS. 2 to 5 relate to possible embodiments of the electronic parking brake device with feedback, as can be used in the exemplary embodiment shown in FIG. 1 of a pneumatic brake device 10.

Each of the shown embodiments of the electronic parking brake devices 116 (FIG. 2), 216 (FIG. 3), 316 (FIG. 4) and 416 (FIG. 5) is intended to be understood as a possible embodiment of the electronic parking brake device 16, as roughly schematically shown in FIG. 1.

Figure 2:
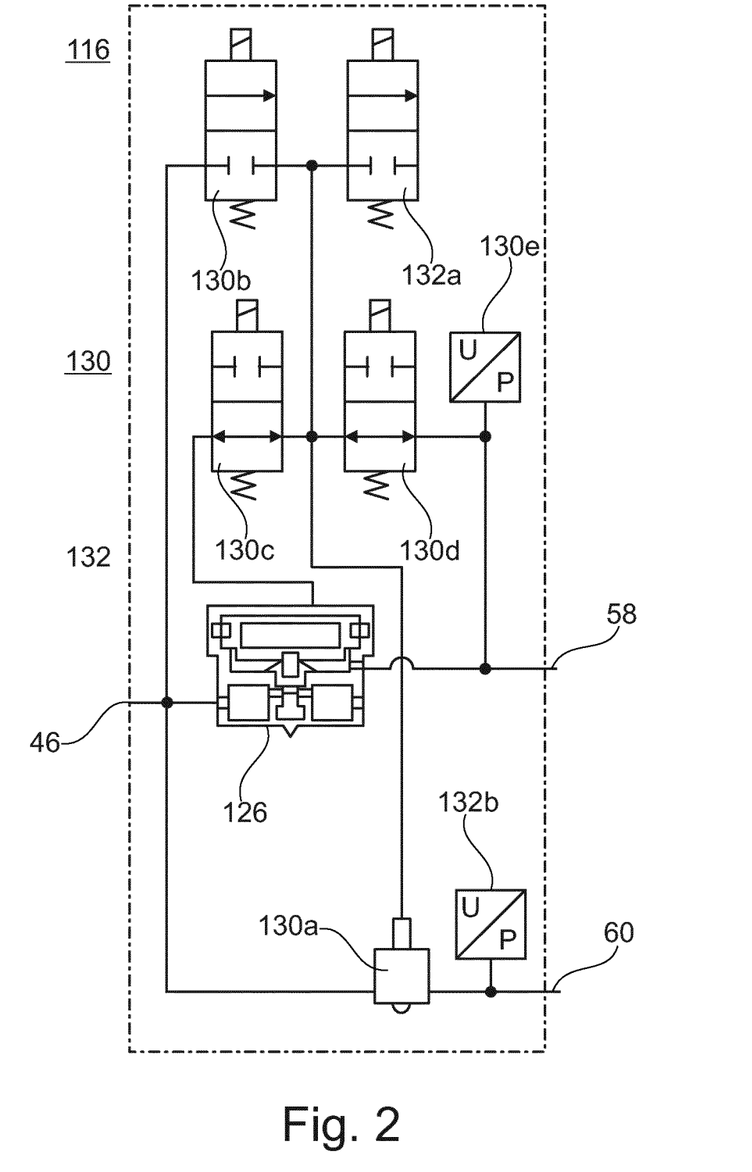
FIG. 2 is a schematic illustration of a first embodiment of an electronic parking brake device.

FIG. 2 shows a first possible embodiment of an electronic parking brake device 116 comprising a bistable valve 126 with feedback.

Here, the bistable valve 126 is a relay valve 126 of the tractor vehicle. Since this bistable valve also actuates the relay valve of the trailer during driving and parking, said valve is to be considered to be functionally related to the bistable valve unit.

The first valve unit 130 has, in a functional context, the relay valve of the trailer 130a, a first solenoid valve 130b, a second solenoid valve 130c and also a third solenoid valve 130d. A pressure sensor 130e is provided adjacent to valve 130d.

The second valve unit 132 is likewise functionally formed by the relay valve of the trailer 130a, a further solenoid valve 132a and also a pressure sensor 132b.

Figure 3:
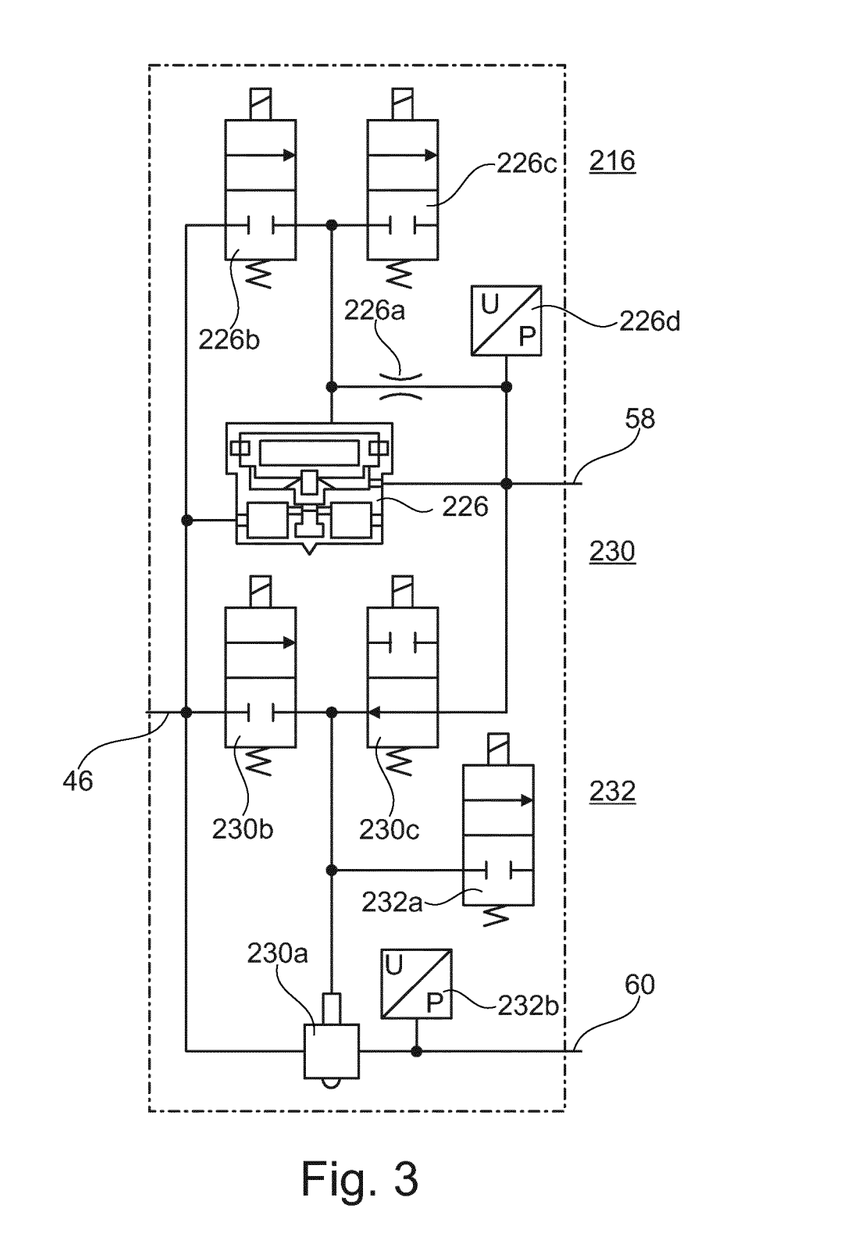
FIG. 3 is a schematic illustration of a second embodiment of an electronic parking brake device.

FIG. 3 shows a schematic view of a further exemplary embodiment of an electronic parking brake device 216 which illustrates a possible embodiment of the parking brake device 16 shown in FIG. 1.

The electronic parking brake device 216 according to FIG. 3 is an embodiment with a pressure sensor and feedback with a throttle.

The bistable valve unit 216 is formed by the relay valve of the tractor vehicle 226 and also by a throttle 226a. The relay valve of the trailer can be further functionally associated with said valve unit here too.

The first valve unit 230 is formed by the relay valve of the trailer 230a, a first solenoid valve 230b and a second solenoid valve 230c.

The second valve unit 232 is likewise formed by the relay valve of the trailer 230a, the solenoid valve 230c, but also by the solenoid valve 232a and the pressure sensor 232b.

Further solenoid valves 226b and 226c are provided for the purpose of actuating the bistable valve unit 226 formed by the relay valve 226 of the tractor vehicle and also the throttle 226a. Furthermore, a further pressure sensor 226d is also provided adjacent to the throttle 226a.

Figure 4:
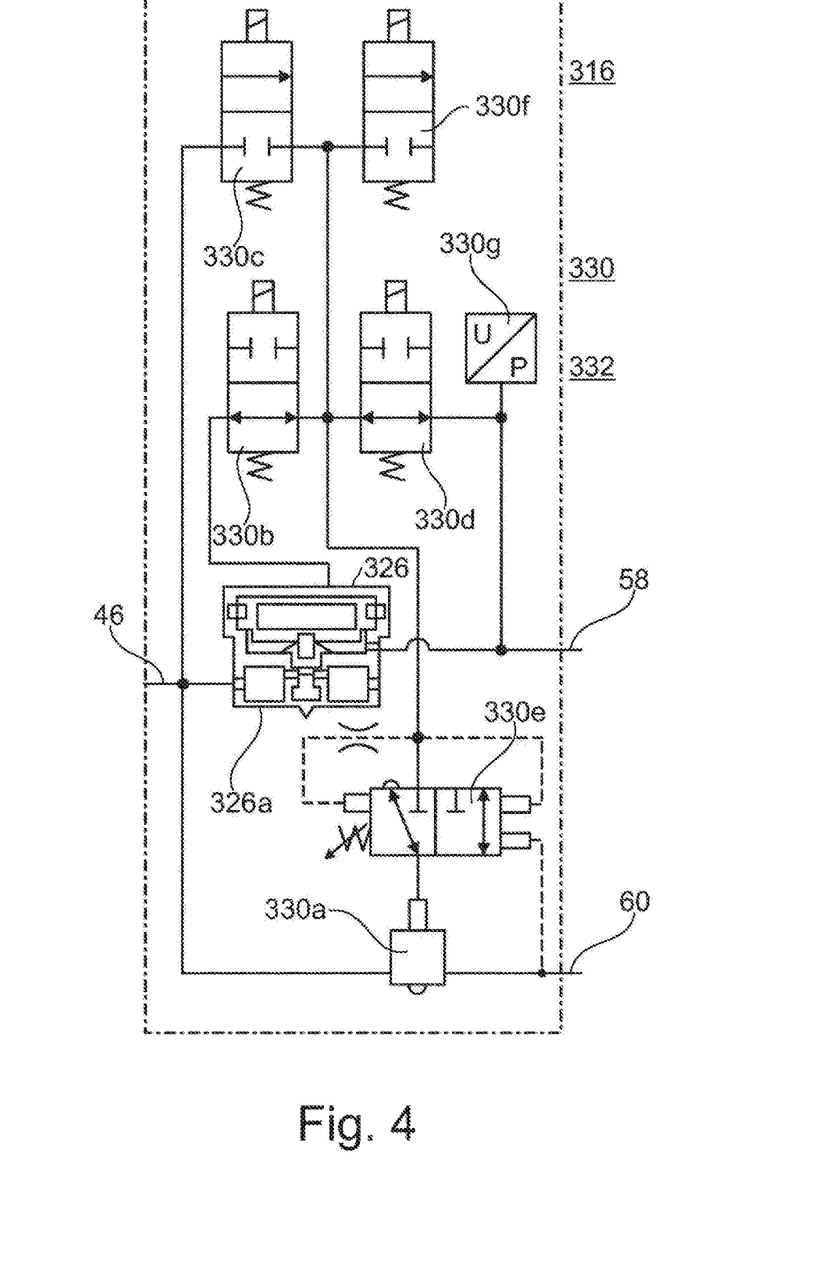
FIG. 4 is a schematic illustration of a third embodiment of an electronic parking brake device.

FIG. 4 shows a schematic illustration of a further exemplary embodiment of an electronic parking brake device 316 which, in the exemplary embodiment according to FIG. 1, illustrates a possible embodiment of the electronic parking brake device 16 shown there.

The bistable valve unit 326 is formed by the relay valve 326a of the tractor vehicle here. The relay valve of the trailer, which relay valve is actuated by said valve, can also be functionally associated with this functional unit.

The first valve unit 330 is formed by the relay valve of the trailer 330a, a solenoid valve 330b and solenoid valves 330c and 330d.

Furthermore, the first valve unit 330 is jointly formed by a pneumatic valve 330e.

The embodiment shown in FIG. 4 represents a possible parking brake device without a throttle but with a feedback function.

The second valve device 332 is formed by the relay valve of the trailer 330a and also the pneumatic valve 330e.

Furthermore, the electronic parking brake device 316 further has a further solenoid valve 330f and also a pressure sensor 330g.

Figure 5:
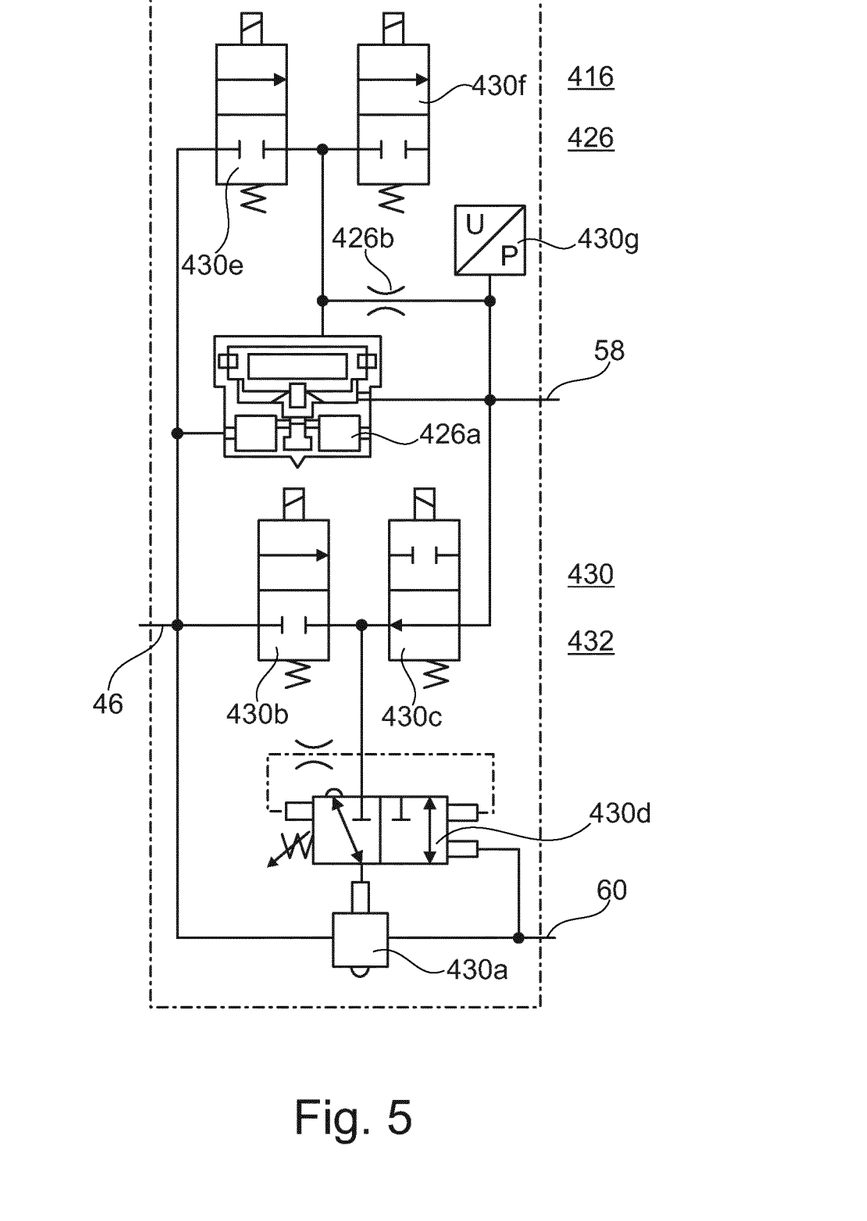
FIG. 5 is a schematic illustration of a fourth embodiment of an electronic parking brake device.

FIG. 5 shows a further embodiment of an electronic parking brake device 416 which illustrates a possible embodiment of the electronic parking brake device 16 shown in FIG. 1.

The bistable valve unit 426 is formed by the relay valve of the tractor vehicle 426a and also by the throttle 426b here. The relay valve of the trailer, which relay valve is actuated by said valve, can also be functionally associated with this functional unit.

The first valve unit 430 is formed by the relay valve of the trailer 430a, a first solenoid valve 430b, a second solenoid valve 430c and also a pneumatic valve 430d.

The second valve unit 432 is formed by the relay valve of the trailer 430a and also by the pneumatic valve 430d.

The electronic parking brake device 416 according to FIG. 5 further has yet further solenoid valves 430e and 430f and also a pressure sensor 430g.

Figure 6:
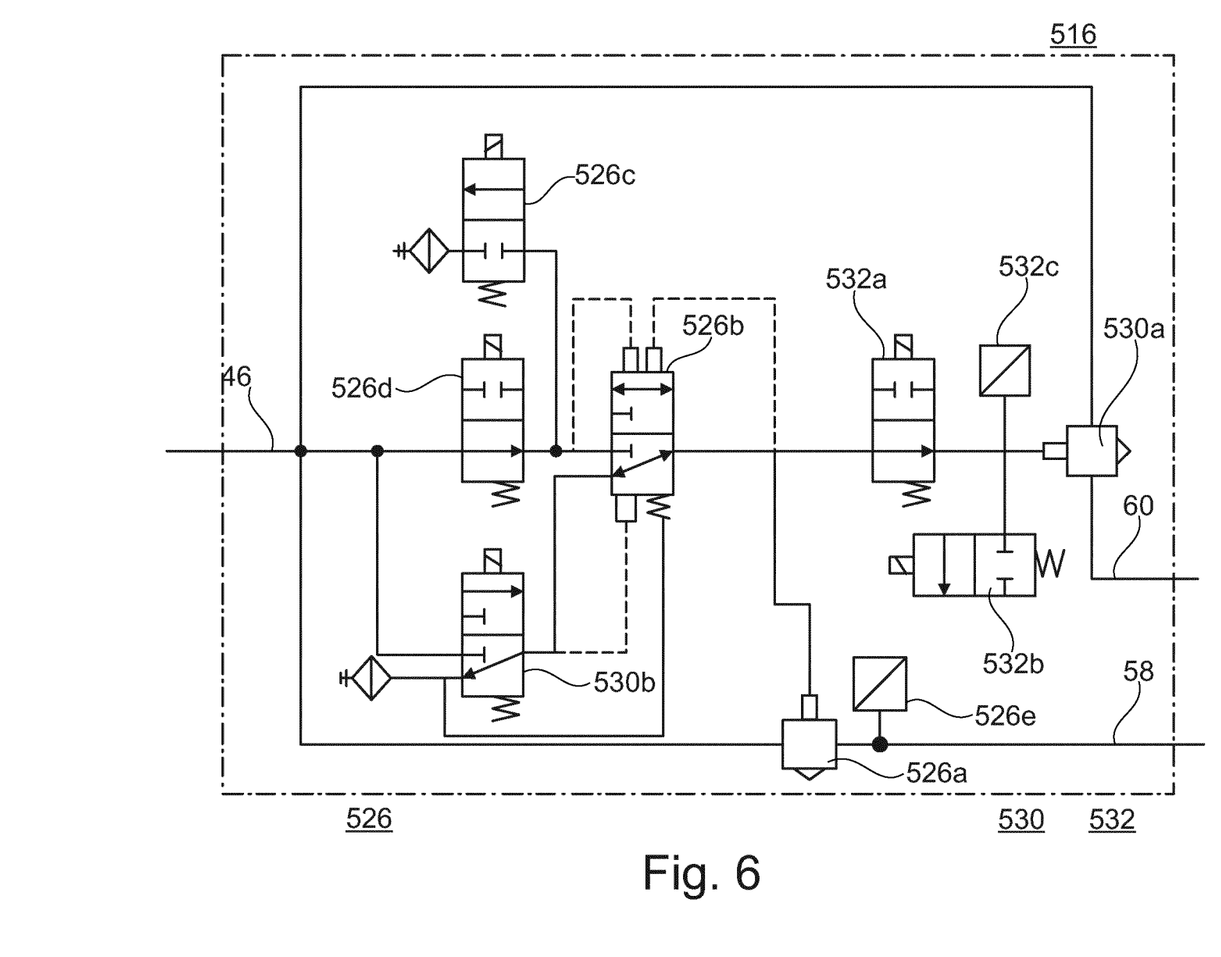
FIG. 6 is a schematic illustration of a fifth embodiment of an electronic parking brake device.
Figure 7:
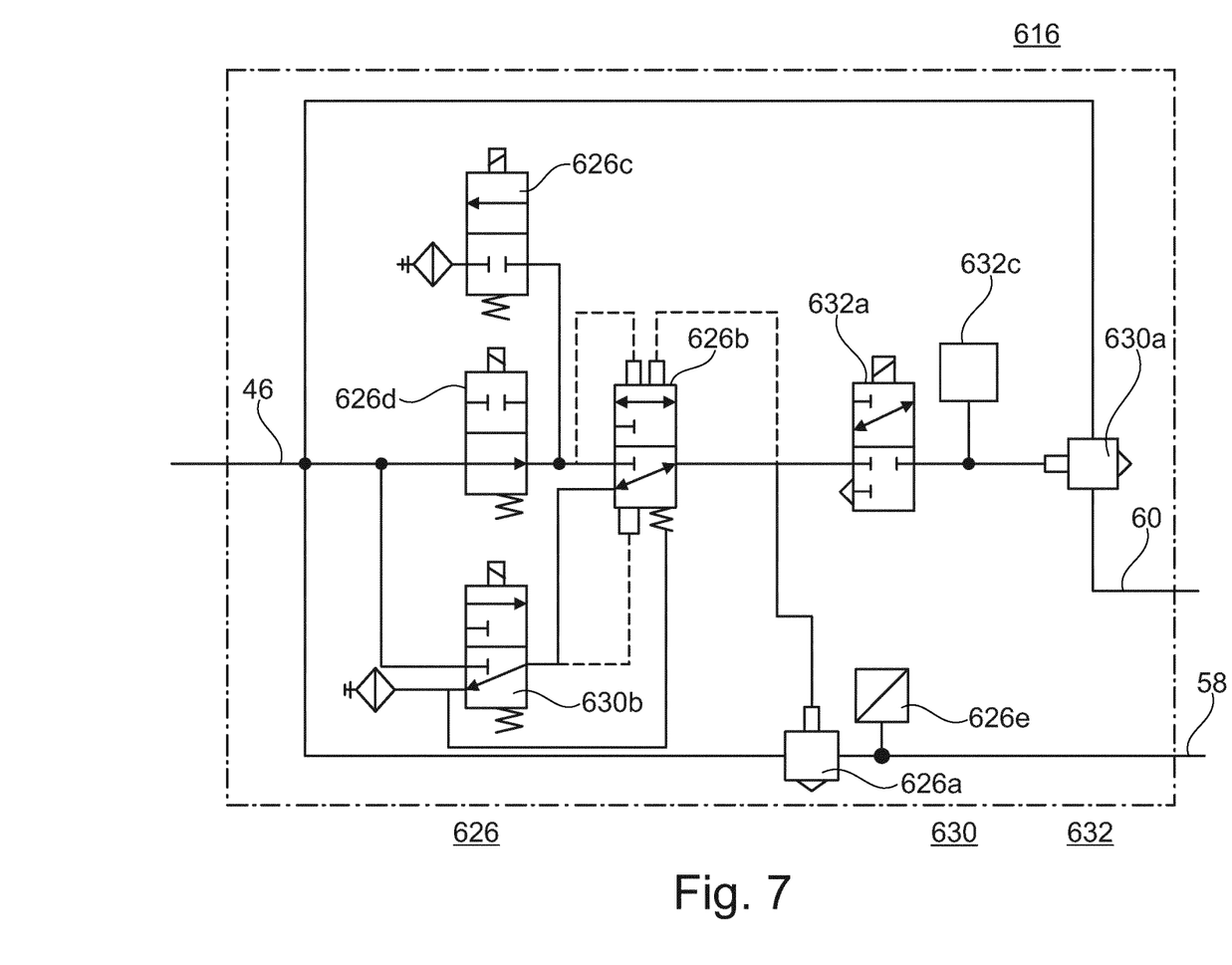
FIG. 7 is a schematic illustration of a sixth embodiment of an electronic parking brake device.

FIGS. 6 and 7 show embodiments of an electronic parking brake device 516 (FIG. 6) and also of an electronic parking brake device 616 (FIG. 7).

In both cases, these embodiments can be a possible refinement of the electronic parking brake device 16 shown in FIG. 1.

The two embodiments of an electronic parking brake device 516, 616 are embodiments with a bistable valve unit without feedback.

The bistable valve unit 526 in FIG. 6 of the electronic parking brake device 516 is formed by the relay valve of the tractor vehicle 526a and a control valve device 526b which can be pneumatically/electrically actuated. Since the control valve device 526b also actuates the relay valve of the trailer during parking and driving, said relay valve can also be associated with this functional unit.

The design and the functionality of an electronic parking brake device 516 of this kind is comparable to the parking brake device, already known from the prior art, with a bistable control valve which actuates a relay valve, cf. DE 10 2008 007 877 B3 for example.

The first valve unit 530 is formed by the relay valve of the trailer 530a and also by a solenoid valve 530b.

The second valve unit 532 is formed by the relay valve of the trailer 530a, a first solenoid valve 532a and also a second solenoid valve 532b and also a pressure sensor 532c.

Further solenoid valves 526c and 526d are provided in front of the control valve 526b at the input end.

Furthermore, a pressure sensor 526e is provided downstream of the relay valve of the tractor vehicle 526a.

The parking brake device 516 is shown in the parked state.

The exemplary embodiment of the electronic parking brake device 616 shown in FIG. 7 is of substantially identical design to the exemplary embodiment shown in FIG. 6. However, a 3/2-way valve 632a which has a deaeration output is provided instead of the valves 532a and also 532b. Therefore, a separate valve 532b is not required for a deaeration function.

The bistable valve unit 626 in FIG. 7 of the electronic parking brake device 616 is formed by the relay valve of the tractor vehicle 626a and a control valve device 626b which can be pneumatically/electrically actuated. Since the control valve device 626b also actuates the relay valve of the trailer during parking and driving, said relay valve can also be associated with this functional unit.

The design and the functionality of an electronic parking brake device 616 of this kind is comparable to the parking brake device, already known from the prior art, with a bistable control valve which actuates a relay valve.

The first valve unit 630 is formed by the relay valve of the trailer 630a and also by a solenoid valve 630b.

The second valve unit 632 is formed by the relay valve of the trailer 630a, a first solenoid valve 632a and also a pressure sensor 632b.

Further solenoid valves 626c and 626d are provided in front of the control valve 626b at the input end.

Furthermore, a pressure sensor 626e is provided downstream of the relay valve of the tractor vehicle 626a.

The parking brake device 616 is shown in the parked state.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Pneumatic brake device
12 Spring store
13 Brake cylinder
14 Compressor
16 Electronic parking brake device
18 Parking valve switching element
20 First switch
22 Second switch
24 Electronic control unit
26 Bistable valve unit
28 Air treatment arrangement
30 First valve device
32 Second valve device
34 First compressed-air container
36 Second compressed-air container
38 Foot brake valve
40 Tractor vehicle protection valve
42 Connection
44 Separate connection
46 Line
48 Line
50 Line
52 Line
54 Line
56 Line
58 Line
60 Line
62 First signal line
64 Second signal line
116 Electronic parking brake device
126 Bistable valve
130 First valve unit
130a Relay valve of the trailer
130b First solenoid valve
130c Second solenoid valve
130d Third solenoid valve
130e Pressure sensor
132 Second valve unit
132a Solenoid valve
132b Pressure sensor
216 Electronic parking brake device
226 Bistable valve unit
226a Throttle
226b Solenoid valve
226c Solenoid valve
226d Pressure sensor
230 First valve unit
230a Relay valve of the trailer
230b First solenoid valve
230c Second solenoid valve
232 Second valve unit
232a Solenoid valve
232b Pressure sensor
316 Electronic parking brake device
326 Bistable valve unit
326a Relay
330 First valve unit
330a Relay valve
330b Solenoid valve
330c Solenoid valve
330d Solenoid valve
330e Pneumatic valve
330f Solenoid valve
330g Pressure sensor
332 Second valve unit
416 Electronic parking brake device
426 Bistable valve unit
426a Relay valve
426b Throttle
430 First valve unit
430a Relay valve
430b Solenoid valve 430c Solenoid valve
430d Pneumatic valve
430e Solenoid valve
430f Solenoid valve
430g Pressure sensor
432 Second valve unit
516 Electronic parking brake device
526 Bistable valve unit
526a Relay
526b Control valve device
526c Solenoid valve
526d Solenoid valve
526e Pressure sensor
530 First valve unit
530a Relay
530b Solenoid valve
532 Second valve unit
532a Solenoid valve
532b Solenoid valve
532c Pressure sensor
616 Electronic parking brake device
626 Bistable valve unit
626a Relay
626b Control valve device
626c Solenoid valve
626d Solenoid valve
626e Pressure sensor
630 First valve unit
630a Relay
630b Solenoid valve
632 Second valve unit
632a 3/2-way valve
632b Pressure sensor

What is claimed is:

1. A pneumatic brake device for a utility vehicle, comprising:
   at least one pneumatically actuable spring store for a parking brake of the utility vehicle;
   an electronic parking brake device, comprising
   at least one electronic control unit,
   at least one bistable valve unit,
   at least one first valve unit by which a parking brake of a trailer of the utility vehicle is deactivatable when the parking brake of the utility vehicle is activated,
   at least one second valve device which is connectable such that, when there is a drop in the system pressure for supplying the parking brake of the trailer, the parking brake of the trailer can be activated, and
   a tractor vehicle protection valve,
   wherein the bistable valve unit comprises a bistable valve with feedback.

2. The pneumatic brake device as claimed in claim 1, wherein
   both the parking brake of the utility vehicle and also the parking brake of the trailer are actuatable by the bistable valve unit.

3. The pneumatic brake device as claimed in claim 1, wherein
   the second valve device has at least one pressure sensor by which a drop in the system pressure below a prespecified threshold value is determinable and a signal can be generated, it being possible for the parking brake of the trailer to be activated by the electronic control unit on the basis of said signal.

4. The pneumatic brake device as claimed in claim 1, wherein
   the second valve device has at least one pneumatic valve by which the parking brake of the trailer is activatable.

5. The pneumatic brake device as claimed in claim 1, wherein
   the bistable valve is a relay valve.

6. The pneumatic brake device as claimed in claim 5, wherein
   the bistable valve unit further has a throttle.

7. The pneumatic brake device as claimed in claim 1, wherein
   the first valve unit includes a relay valve of the trailer and at least two further solenoid valves.

8. The pneumatic brake device as claimed in claim 1, wherein
   the second valve unit includes a relay valve of the trailer, at least two further solenoid valves and also at least one pressure sensor.

9. The pneumatic brake device as claimed in claim 1, wherein
   the second valve unit includes a relay valve of the trailer and at least one deaeration valve.

10. The pneumatic brake device as claimed in claim 2, wherein
    the tractor vehicle protection valve is a constituent part of the electronic parking brake device.

* * * * *